US012791092B2

(12) United States Patent
Suzuki et al.

(10) Patent No.: US 12,791,092 B2
(45) Date of Patent: Nov. 10, 2026

(54) TRANSMISSION DEVICE

(71) Applicant: MUSASHI SEIMITSU INDUSTRY CO., LTD., Toyohashi (JP)

(72) Inventors: Mutsumi Suzuki, Toyohashi (JP); Nobuyasu Kato, Toyohashi (JP); Naofumi Butta, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 19/118,133

(22) PCT Filed: Oct. 7, 2022

(86) PCT No.: PCT/JP2022/037703
§ 371 (c)(1),
(2) Date: Apr. 3, 2025

(87) PCT Pub. No.: WO2024/075293
PCT Pub. Date: Apr. 11, 2024

(65) Prior Publication Data
US 2026/0132844 A1 May 14, 2026

(51) Int. Cl.
*F16H 57/04* (2010.01)

(52) U.S. Cl.
CPC ..... *F16H 57/0424* (2013.01); *F16H 57/0423* (2013.01); *F16H 57/0457* (2013.01); *F16H 57/0483* (2013.01); *F16H 57/0471* (2013.01)

(58) Field of Classification Search
CPC ............. F16H 57/0423; F16H 57/0424; F16H 57/0457; F16H 57/0483
See application file for complete search history.

(56) References Cited

U.S. PATENT DOCUMENTS 11,598,410 B2 * 3/2023 Ishikawa ............. F16H 57/0457
11,959,543 B2 * 4/2024 Kanase ............... F16H 57/0471
(Continued)

FOREIGN PATENT DOCUMENTS

CN 111692324 A 9/2020
JP 2003-336729 A 11/2003
(Continued)

OTHER PUBLICATIONS

Office Action, Notice of Reasons for Refusal, dated Aug. 19, 2025, issued in a corresponding Japanese Patent No. 2024-555600 with the English machine translation thereof.
(Continued)

*Primary Examiner* — Minh Truong
(74) *Attorney, Agent, or Firm* — Carrier, Shende & Associates P.C.; Joseph P. Carrier; Fulchand P. Shende

(57) ABSTRACT

Provided is a transmission device capable of suppressing a decrease in an amount of supply of oil to a catch tank. An aspect of the present disclosure is a transmission device. The transmission mechanism includes an input gear, a counter gear, and a ring gear. The gear case includes a catch tank, a guide, and a guide portion that is disposed to be shifted from the guide in the axial direction of the ring gear and guides the oil to the guide. The guide has an upstream end and a downstream end in the oil flow direction. The upstream end is located radially outward of the ring gear. The guide portion extends from a first end coupled to the upstream end of the guide to a second end overlapping the ring gear when viewed in the axial direction of the ring gear.

3 Claims, 12 Drawing Sheets

(56) References Cited

U.S. PATENT DOCUMENTS

| | | | | |
|---|---|---|---|---|
| 2016/0123455 | A1 | 5/2016 | Mikami et al. | |
| 2019/0249765 | A1 | 8/2019 | Ito et al. | |
| 2021/0054920 | A1* | 2/2021 | Balistreri | F16H 57/0423 |
| 2022/0025968 | A1 | 1/2022 | Leloup et al. | |
| 2022/0099177 | A1* | 3/2022 | Tamura | F16H 57/0457 |
| 2022/0282783 | A1 | 9/2022 | Nakata et al. | |
| 2022/0290753 | A1* | 9/2022 | Nonoyama | F16H 63/3433 |

FOREIGN PATENT DOCUMENTS

| | | | |
|---|---|---|---|
| JP | 2009-074564 | A | 4/2009 |
| JP | 2010-249256 | A | 11/2010 |
| JP | 2012-189176 | A | 10/2012 |
| JP | 2012-189178 | A | 10/2012 |
| JP | 2014-015977 | A | 1/2014 |
| JP | 2016-089861 | A | 5/2016 |
| JP | 2019-138381 | A | 8/2019 |
| JP | 2020-153420 | A | 9/2020 |
| JP | 2021-063536 | A | 4/2021 |
| JP | 2022-502614 | A | 1/2022 |
| JP | 2022-136861 | A | 9/2022 |
| WO | 2020/069887 | A1 | 4/2020 |

OTHER PUBLICATIONS

The English translation of the PCT/ISA/210 from International Application PCT/JP2022/037702.

PCT/ISA/237 from International Application PCT/JP2022/037702 with the English translation thereof.

PCT/IPEA/409 from International Application PCT/JP2022/037702.

The English translation of the PCT/ISA/210 from International Application PCT/JP2022/037703.

PCT/ISA/237 from International Application PCT/JP2022/037703 with the English translation thereof.

The English translation of the PCT/ISA/210 from International Application PCT/JP2022/037704.

PCT/ISA/237 from from International Application PCT/JP2022/037704 with the English translation thereof.

PCT/ISA/210 from International Application PCT/JP2022/037705 with the English translation thereof.

PCT/ISA/237 from from International Application PCT/JP2022/037705 with the English translation thereof.

The English translation of PCT/ISA/210 from International Application PCT/JP2022/037706.

PCT/ISA/237 from from International Application PCT/JP2022/037706 with the English translation thereof.

PCT/ISA/237 from International Application PCT/JP2022/037705 with the English translation thereof.

PCT/ISA/237 from International Application PCT/JP2022/037706 with the English translation thereof.

Office Action, Notice of Reasons for Refusal, dated Nov. 11, 2025, issued in the corresponding Japanese Patent Application No. 2024-555601, with the English translation thereof.

Office Action, Notice of Reasons for Refusal, dated Nov. 11, 2025, issued in the corresponding Japanese Patent Application No. 2024-555602, with the English translation thereof.

Office Action issued on Jun. 2, 2026 in the corresponding U.S. Appl. No. 19/114,886.

* cited by examiner

TRANSMISSION DEVICE

TECHNICAL FIELD

The present disclosure relates to a transmission device.

BACKGROUND ART

In a transmission device having a differential mechanism, a structure is known in which oil for bearing lubrication scraped up by a gear is supplied to a catch tank via a guide (see Patent Document 1).

PRIOR ART DOCUMENTS

Patent Documents

Patent Document 1: Japanese Unexamined Patent Application Publication No. 2016-089861

SUMMARY OF THE INVENTION

Problems to be Solved by the Invention

In the transmission device described above, when the rotation speed of the ring gear is low, the amount of oil that does not reach the guide increases. Therefore, the amount of oil in which the ring gear is immersed increases as the oil stored in the catch tank decreases. Therefore, the stirring resistance of the ring gear increases.

An aspect of the present disclosure preferably provides a transmission device capable of suppressing a decrease in an amount of oil supplied to a catch tank.

Means for Solving the Problems

An aspect of the present disclosure is a transmission device including a transmission mechanism and a gear case that accommodates the transmission mechanism. The transmission mechanism includes an input gear, a counter gear having a rotation axis parallel to a rotation axis of the input gear, a ring gear having a rotation axis parallel to the rotation axis of the input gear, a differential case fixed to the ring gear, a differential mechanism disposed inside the differential case, an input gear bearing rotatably supporting the input gear, a counter gear bearing rotatably supporting the counter gear, and a differential case bearing rotatably supporting the differential case.

The counter gear includes a first gear that meshes with the input gear, and a second gear that has a smaller outer diameter than the first gear, is disposed concentrically with the first gear, and meshes with the ring gear. The gear case includes a catch tank, a guide that sends the oil scraped up by the ring gear to the catch tank, and a guide portion that is disposed to be shifted from the guide in the axial direction of the ring gear and guides the oil to the guide. The guide has an upstream end and a downstream end in the oil flow direction. The upstream end is located radially outward of the ring gear. The guide portion extends from a first end coupled to the upstream end of the guide to a second end overlapping the ring gear when viewed in the axial direction of the ring gear.

According to such a configuration, of the oil scraped up by the ring gear, the oil pushed out in the axial direction of the ring gear is supplied from the guide portion to the guide. Therefore, it is possible to suppress a decrease in the amount of oil supplied to the catch tank.

In an aspect of the present disclosure, the ring gear may be a helical gear that is twisted so that oil is sent toward the guide portion when the ring gear rotates in a direction in which the oil is scraped up toward the guide. According to such a configuration, since the oil can be brought close to the guide portion by the torsion of the ring gear, the effect of suppressing the decrease in the amount of oil supplied to the catch tank is promoted.

In an aspect of the present disclosure, the second end of the guide portion may overlap a portion before reaching the uppermost point of the ring gear or the uppermost point of the ring gear when the ring gear rotates in the direction in which the oil is scraped up toward the guide when viewed in the axial direction of the ring gear. According to such a configuration, the oil falling off by gravity from the tooth reaching the uppermost point of the ring gear easily reaches the guide portion. As a result, the effect of suppressing the decrease in the amount of oil supplied to the catch tank is promoted.

In an aspect of the present disclosure, the guide portion may be a recess provided in the inner face of the gear case. According to such a configuration, the shape of the guide portion can be simplified, and the formation cost of the guide portion can be reduced.

In an aspect of the present disclosure, the differential case may have a window communicating therein. The gear case may have a hanging wall extending downward from the second end of the guide portion toward the window. According to such a configuration, the oil that cannot reach the guide through the guide portion can be efficiently supplied to the inside of the differential case by the hanging wall.

EXPLANATION OF REFERENCE NUMERALS

1 . . . transmission device, 2 . . . transmission mechanism, 3 . . . gear case, 3A . . . first case, 3B . . . second case, 21 . . . input gear, 22 . . . counter gear, 23 . . . ring gear, 24 . . . differential case, 31 . . . catch tank, 32 . . . main guide, 33 . . . guide portion, 34 . . . hanging wall, 35 . . . buffer portion, 36 . . . lower guide, 37 . . . reverse guide, 221 . . . a first gear, 222 . . . second gear, 311 . . . bottom wall, 311A, 311B . . . communication hole, 312 . . . side wall, 312A . . . outflow portion, 321 . . . upstream end, 322 . . . downstream end, 323 . . . guide face, 323A . . . groove, 331 . . . first end, 332 . . . second end, 351 . . . bottom wall, 352 . . . side wall, 352A . . . outflow portion, 371 . . . upstream end, 372 . . . downstream end, 373 . . . guide face

MODE FOR CARRYING OUT THE INVENTION

Hereinafter, embodiments to which the present disclosure is applied will be described with reference to the drawings.

1. First Embodiment

[1-1. Configuration]

Figure 1:
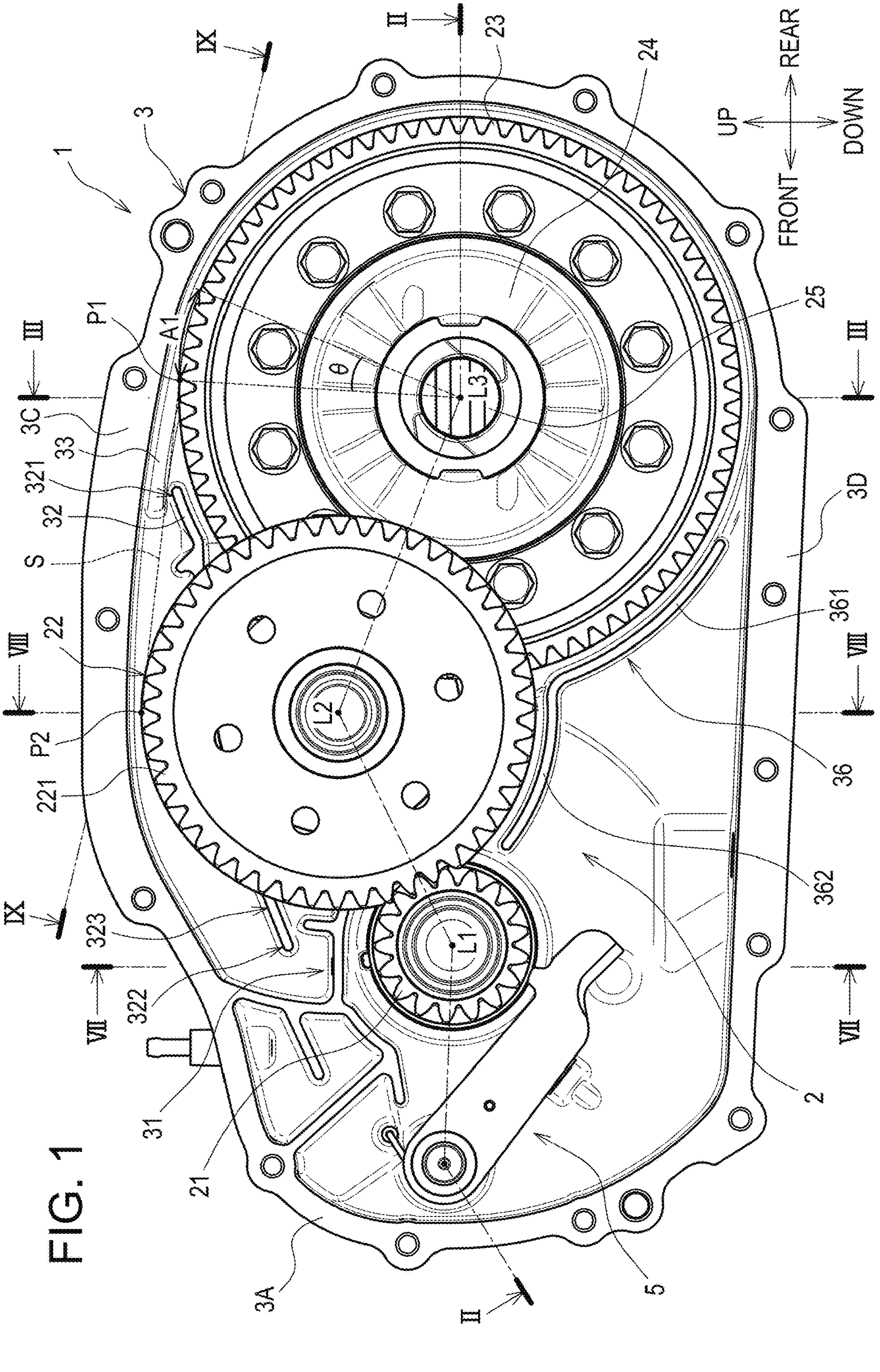
FIG. 1 is a schematic right side view of a transmission device according to an embodiment in a state in which a second case and part of a bearing are removed.

A transmission device 1 illustrated in FIG. 1 is a device that is installed in a vehicle and transmits power of a drive source of the vehicle to wheels.

The transmission device 1 includes a transmission mechanism 2, a gear case 3, and a parking lock mechanism 5. The transmission device 1 is installed in a vehicle in an attitude in which a direction parallel to a rotation axis L1 of an input gear 21 of the transmission mechanism 2 is a left-right direction, and a direction in which the input gear 21 is disposed with respect to a ring gear 23 is a forward direction.

<Transmission Mechanism>

The transmission mechanism 2 includes the input gear 21, a counter gear 22, the ring gear 23, a differential case 24, and a differential mechanism 25.

Figure 2:
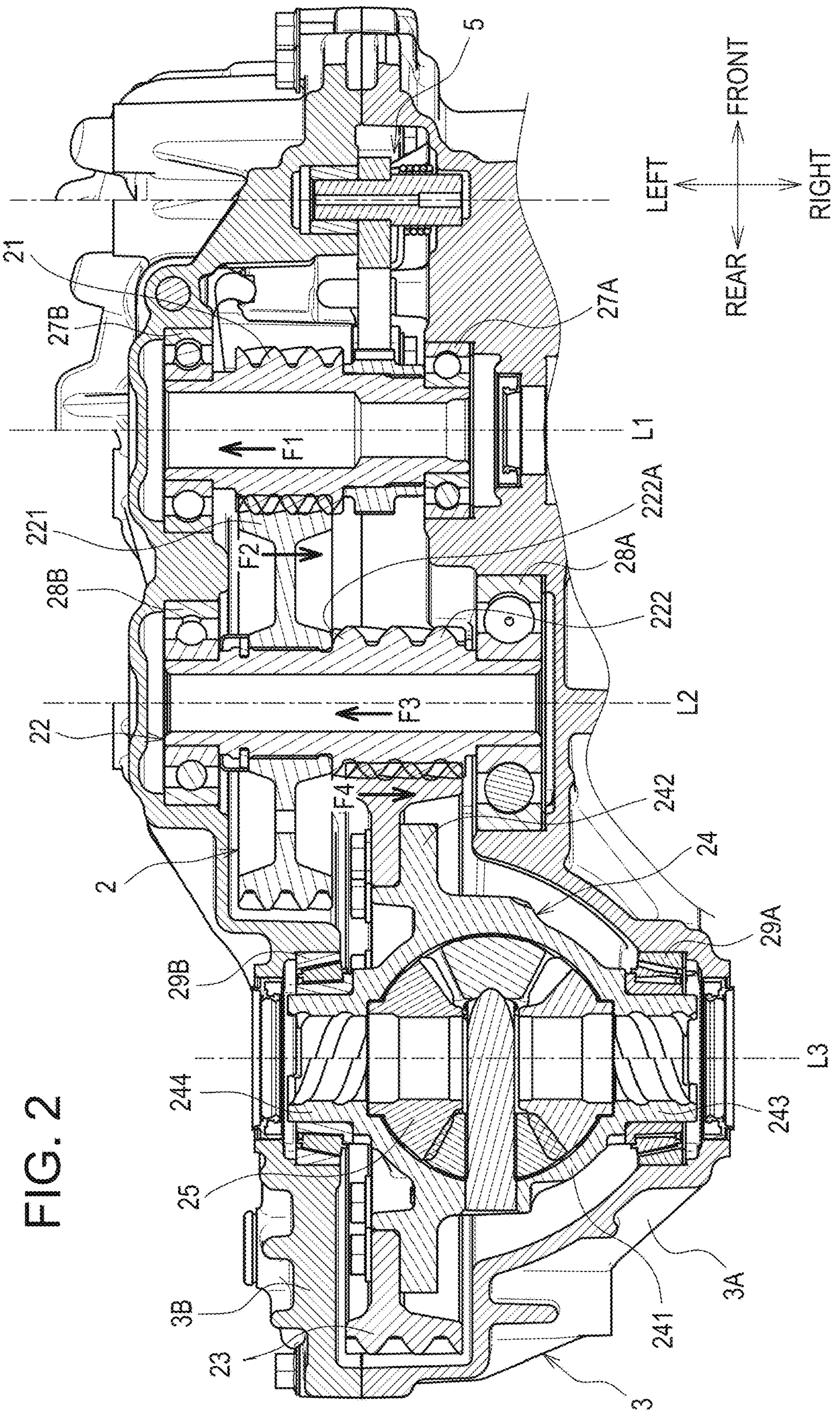
FIG. 2 is a schematic cross-sectional view taken along line II-II in FIG. 1.

Further, as illustrated in FIG. 2, the transmission mechanism 2 includes a first input gear bearing 27A, a second input gear bearing 27B, a first counter gear bearing 28A, a second counter gear bearing 28B, a first differential case bearing 29A, and a second differential case bearing 29B.

<Input Gear>

The input gear 21 is an external gear that is drivingly coupled to a motor (not illustrated) and axially rotates by a driving force of the motor.

The input gear 21 rotates counterclockwise in FIG. 1 when the vehicle moves forward, and rotates clockwise in FIG. 1 when the vehicle moves backward. The rotation axis L1 of the input gear 21 is parallel to the left-right direction.

The input gear 21 is a right-twisted helical gear. As illustrated in FIG. 2, a thrust load F1 in the left direction is generated in the input gear 21 when the vehicle is driven in the forward direction.

<Counter Gear>

The counter gear 22 has a rotation axis L2 parallel to the rotation axis L1 of the input gear 21.

The rotation axis L2 of the counter gear 22 is located behind the rotation axis L1 of the input gear 21 and above the rotation axis L1 of the input gear 21 and the rotation axis L3 of the ring gear 23 (see FIG. 1). The counter gear 22 includes a first gear 221 and a second gear 222.

The first gear 221 is an external gear that meshes with the input gear 21. The first gear 221 is a left-twisted helical gear. A thrust load F2 in the right direction is generated in the first gear 221 when the vehicle is driven in the forward direction.

When the first gear 221 rotates in the backward direction of the vehicle due to the twist of the first gear 221, the oil scraped up by the first gear 221 is sent to the left.

That is, the first gear 221 is twisted so that the oil is sent toward the inner face of a second case 3B and a reverse guide 37 provided on the inner face when the first gear 221 rotates in the backward direction of the vehicle.

The second gear 222 is an external gear that meshes with the ring gear 23. The second gear 222 has an outer diameter smaller than that of the first gear 221 and is disposed concentrically with the first gear 221. The second gear 222 is disposed right of the first gear 221.

The second gear 222 is a left-twisted helical gear. The second gear 222 rotates integrally with the first gear 221. A thrust load F3 in the left direction is generated in the second gear 222 when the vehicle is driven in the forward direction. The second gear 222 has a stepped portion 222A in contact with the first gear 221 in the axial direction. The thrust load F2 of the first gear 221 is received by the stepped portion 222A of the second gear 222. Since the thrust load F2 of the first gear 221 and the thrust load F3 of the second gear 222 cancel each other, the thrust loads applied to the first counter gear bearing 28A and the second counter gear bearing 28B are reduced.

<Ring Gear>

The ring gear 23 is an external gear having a rotation axis L3 parallel to the rotation axis L1 of the input gear 21. The rotation axis L3 of the ring gear 23 is positioned behind the rotation axis L2 of the counter gear 22.

The ring gear 23 rotates the differential case 24 by the rotational force sent from the counter gear 22, and scrapes up the lubricating oil accumulated at the bottom of the gear case 3 toward a main guide 32.

The ring gear 23 is a right-twisted helical gear. A thrust load F4 in the right direction is generated in the ring gear 23 when the vehicle is driven in the forward direction. The thrust load F4 is received by a flange portion 242 of the differential case 24.

Further, due to the torsion of the ring gear 23, when the ring gear 23 rotates in the forward direction of the vehicle, the oil scraped up by the ring gear 23 is sent rightward.

That is, the ring gear 23 is twisted so that the oil is sent toward the inner face of a first case 3A and a guide portion 33 provided on the inner face when the ring gear 23 rotates in the direction in which the oil is scraped up toward the main guide 32 (that is, the forward direction of the vehicle).

In other words, the ring gear 23 is twisted so that the oil is sent to the first differential case bearing 29A along the axial direction of the ring gear 23 when the ring gear 23 rotates in the direction in which the oil is scraped up toward the main guide 32.

<Differential Case>

Figure 3:
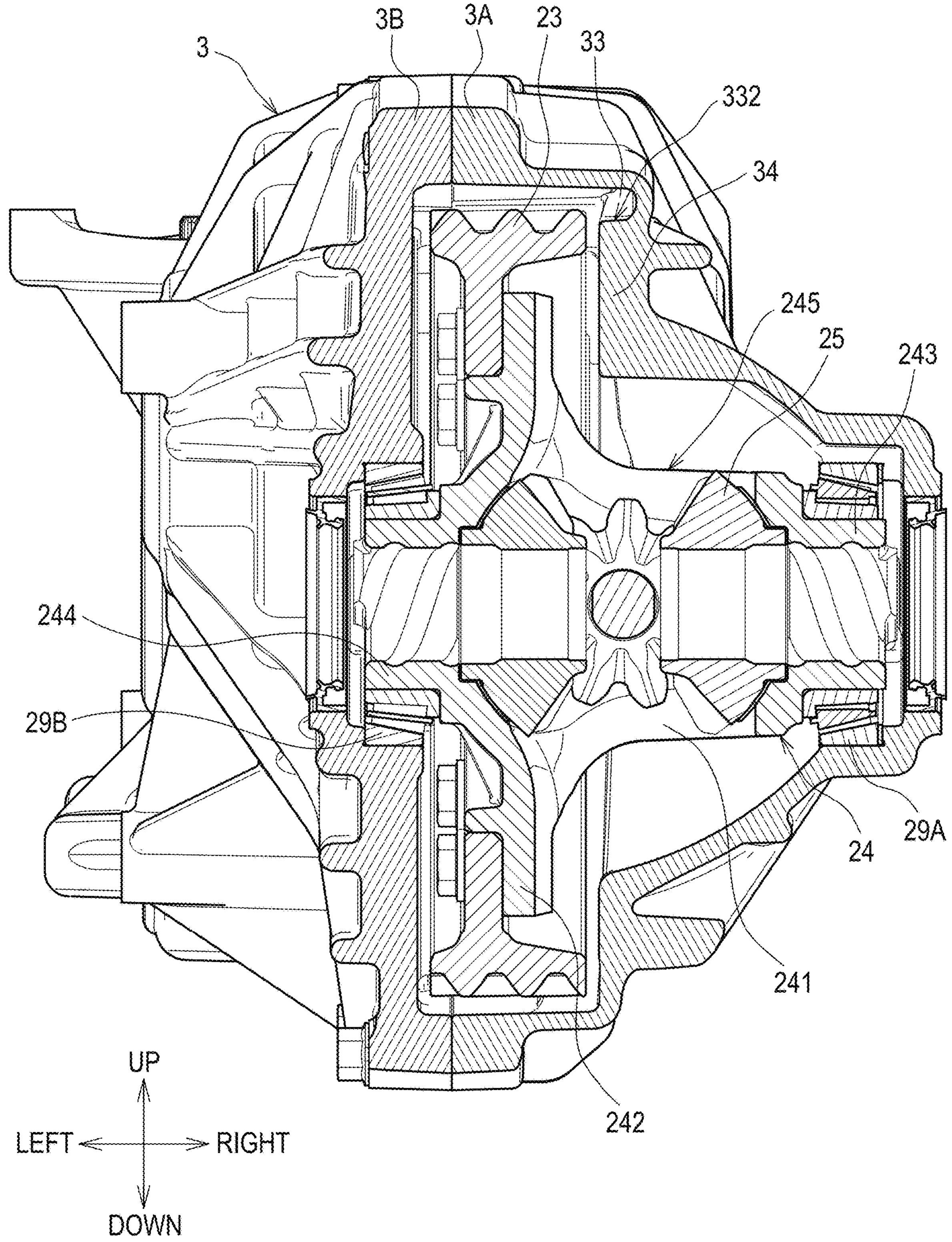
FIG. 3 is a schematic cross-sectional view taken along line III-III of FIG. 1.

The differential case 24 is fixed to the ring gear 23 and rotates about the rotation axis L3 of the ring gear 23 together with the ring gear 23. As illustrated in FIG. 3, the differential case 24 includes a differential mechanism accommodation portion 241, the flange portion 242, a first shaft portion 243, a second shaft portion 244, and a window 245.

The differential mechanism accommodation portion 241 accommodates the differential mechanism 25. The flange portion 242 protrudes radially outward from the differential mechanism accommodation portion 241. The ring gear 23 is fixed to the flange portion 242.

The first shaft portion 243 is a cylindrical portion through which a first output shaft (not illustrated) coupled to the differential mechanism 25 is inserted. The second shaft portion 244 is a cylindrical portion through which a second output shaft (not illustrated) coupled to the differential mechanism 25 is inserted. The window 245 is an opening that communicates the inside of the differential mechanism accommodation portion 241 and the outside of the differential mechanism accommodation portion 241.

<Differential Mechanism>

The differential mechanism 25 is a known mechanism that distributes and transmits the rotation of the differential case 24 to the first output shaft and the second output shaft while differentially rotating the first output shaft and the second output shaft. The differential mechanism 25 is disposed inside the differential mechanism accommodation portion 241.

The differential mechanism 25 includes two side gears coupled to the first output shaft and the second output shaft, and two pinion gears that transmit the rotation of the differential case 24 to the two side gears.

The rotation axes of the first output shaft and the second output shaft coincide with the rotation axis of the ring gear 23. The first output shaft and the second output shaft rotate in accordance with the rotation direction of the input gear 21 (that is, the rotation direction of the differential case 24) while differentially rotating.

<Input Gear Bearing>

The first input gear bearing 27A and the second input gear bearing 27B illustrated in FIG. 2 are ball bearings that rotatably support the input gear 21.

The second input gear bearing 27B is disposed opposite to the first input gear bearing 27A with respect to teeth of the input gear 21 in the axial direction of the input gear 21. Specifically, the first input gear bearing 27A supports the right end of the shaft of the input gear 21, and the second input gear bearing 27B supports the left end of the shaft of the input gear 21.

The first input gear bearing 27A is attached to the first case 3A. The second input gear bearing 27B is attached to the second case 3B.

<Counter Gear Bearing>

The first counter gear bearing 28A and the second counter gear bearing 28B are ball bearings that rotatably support the counter gear 22.

The second counter gear bearing 28B is disposed opposite to the first counter gear bearing 28A with respect to the first gear 221 and the second gear 222 in the axial direction of the counter gear 22. Specifically, the first counter gear bearing 28A supports the right end of the shaft portion of the counter gear 22, and the second counter gear bearing 28B supports the left end of the shaft portion of the counter gear 22.

The first counter gear bearing 28A is attached to the first case 3A. The second counter gear bearing 28B is attached to the second case 3B.

<Differential Case Bearing>

The first differential case bearing 29A and the second differential case bearing 29B are tapered roller bearings that rotatably support the differential case 24.

The second differential case bearing 29B is disposed opposite to the first differential case bearing 29A with respect to the ring gear 23 in the axial direction of the ring gear 23. Specifically, the first differential case bearing 29A supports the first shaft portion 243 of the differential case 24, and the second differential case bearing 29B supports the second shaft portion 244 of the differential case 24.

The first differential case bearing 29A is attached to the first case 3A. The second differential case bearing 29B is attached to the second case 3B.

<Gear Case>

The gear case 3 accommodates the transmission mechanism 2. The gear case 3 includes a first case 3A and a second case 3B that sandwich the transmission mechanism 2 in the axial direction (that is, the left-right direction) of the input gear 21.

The first case 3A and the second case 3B are coupled to each other by a plurality of bolts to constitute an accommodation space for accommodating the transmission mechanism 2, the parking lock mechanism 5, and the oil. In FIG. 2, illustration of a portion of the first case 3A in which a motor (not illustrated) as a drive source is accommodated is omitted.

As illustrated in FIG. 1, in the joint face with the second case 3B in the outer frame of the first case 3A, a first upper central portion 3C and a first lower central portion 3D have widths (that is, thicknesses in the vertical direction) larger than those of other regions. The first upper central portion 3C is a region overlapping part of the input gear 21, the entire counter gear 22, and part of the ring gear 23 from above. The first lower central portion 3D is a region overlapping part of the input gear 21, the entire counter gear 22, and part of the ring gear 23 from below.

Figure 4:
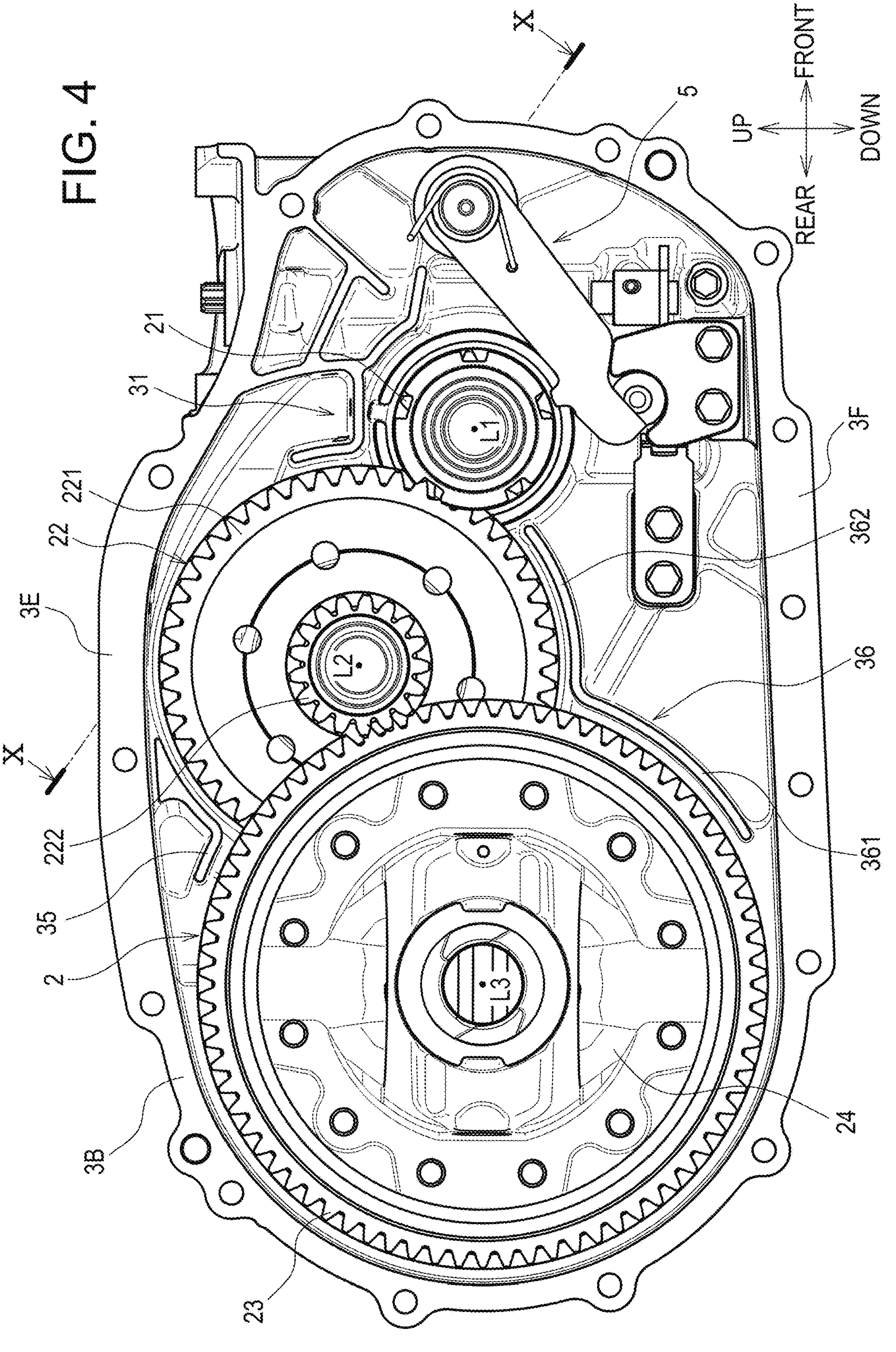
FIG. 4 is a schematic left side view of the transmission device of FIG. 1 in a state where a first case and part of a bearing are removed.

As illustrated in FIG. 4, in the joint face with the first case 3A in the outer frame of the second case 3B, a second upper central portion 3E and a second lower central portion 3F joined to the first upper central portion 3C and the first lower central portion 3D of the first case 3A, respectively, have widths larger than those of other regions, as in the first upper central portion 3C and the first lower central portion 3D.

By increasing the width of the joint face in the central portion of the gear case 3 in this manner, it is possible to suppress leaking of oil to the outside of the gear case 3 when the gear case 3 is deformed by a load while suppressing an increase in size of the gear case 3.

Figure 5:
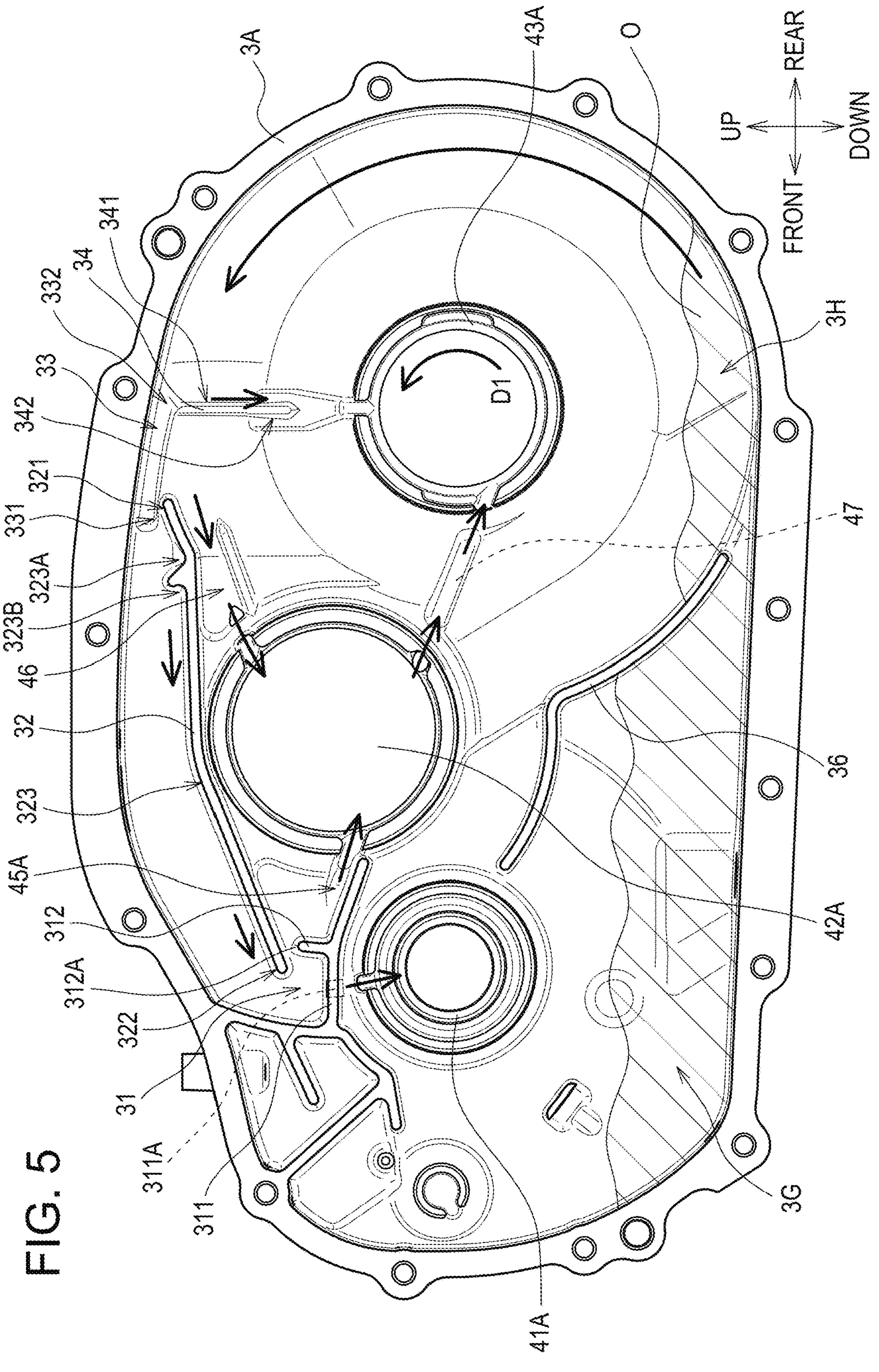
FIG. 5 is a schematic right side view of the first case of FIG. 1.
Figure 6:
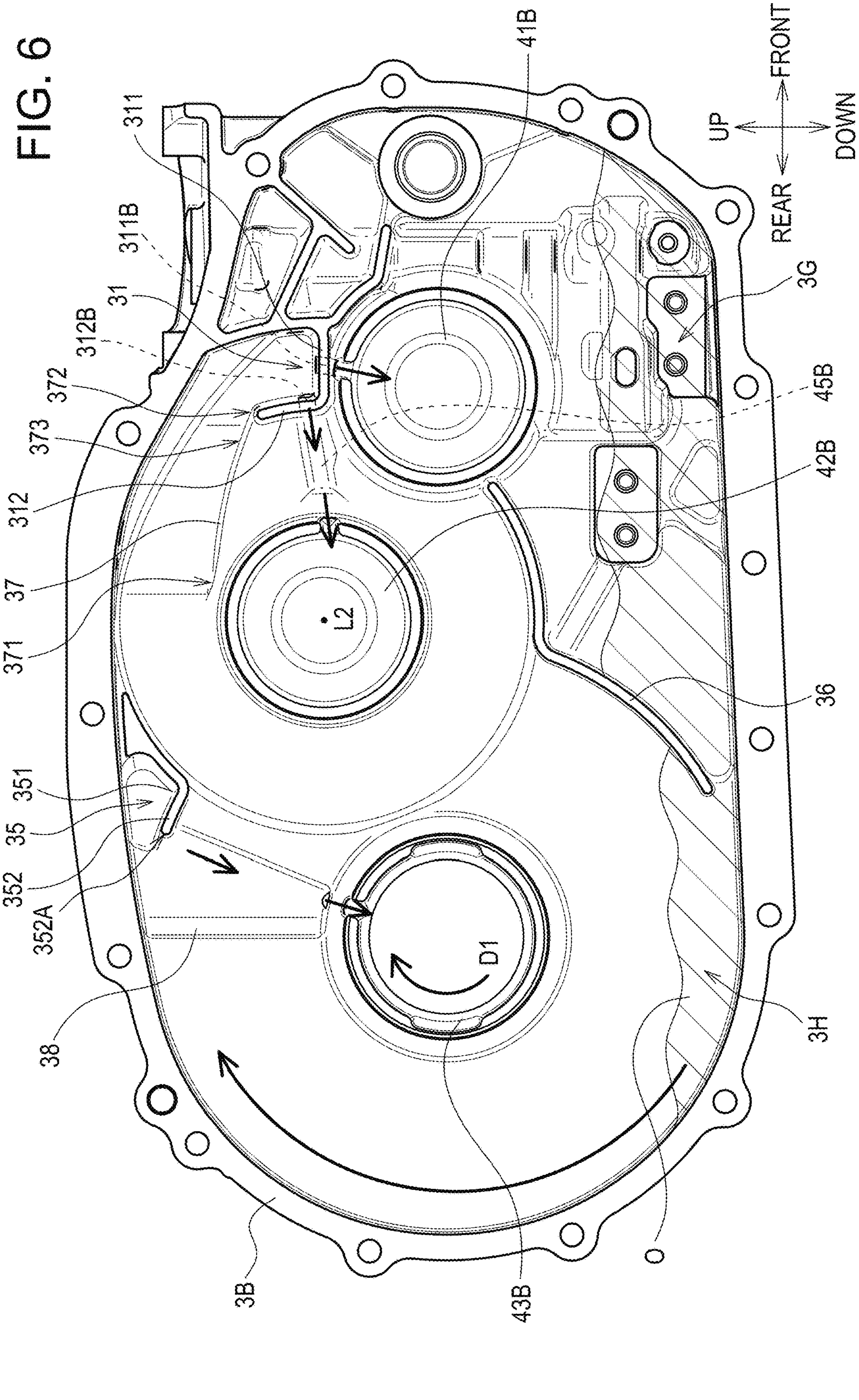
FIG. 6 is a schematic left side view of the second case of FIG. 4.

As illustrated in FIGS. 5 and 6, the gear case 3 includes a catch tank 31, a main guide 32, a guide portion 33, a hanging wall 34, a buffer portion 35, a lower guide 36, a reverse guide 37, a reverse hanging wall 38, a first input gear bearing accommodation portion 41A, a second input gear bearing accommodation portion 41B, a first counter gear bearing accommodation portion 42A, a second counter gear bearing accommodation portion 42B, a first differential case bearing accommodation portion 43A, a second differential case bearing accommodation portion 43B, a right first counter gear flow path 45A, a left first counter gear flow path 45B, a second counter gear flow path 46, and a differential case flow path 47.

<Catch Tank>

The catch tank 31 is a portion that stores the oil scraped up by the ring gear 23. The catch tank 31 includes a rib protruding from the inner face of the first case 3A toward the second case 3B (that is, leftward) and a rib protruding from the inner face of the second case 3B toward the first case 3A (that is, rightward).

Figure 7:
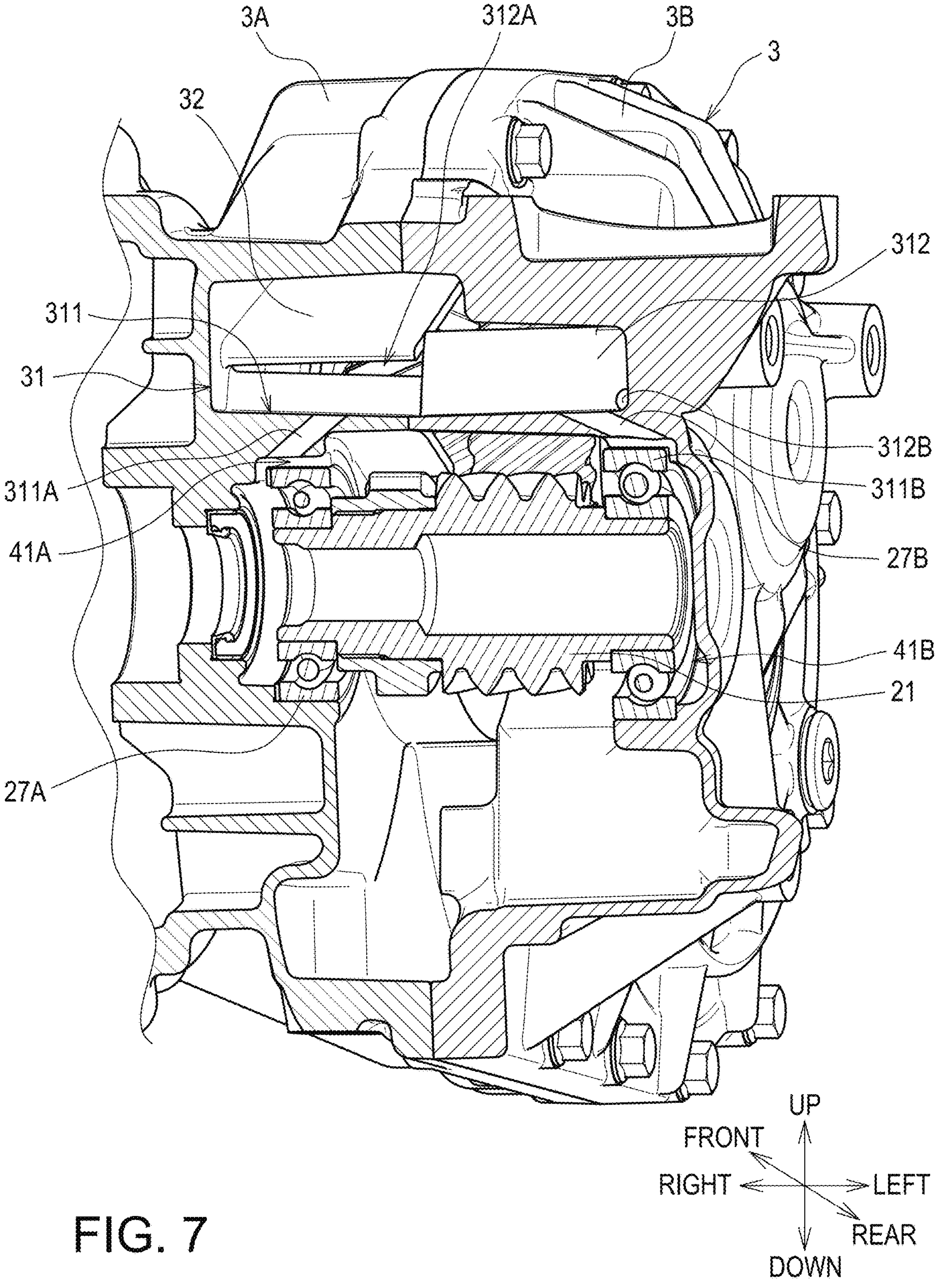
FIG. 7 is a schematic cross-sectional view taken along line VII-VII in FIG. 1.

As illustrated in FIG. 1, the catch tank 31 is disposed in front of the counter gear 22 and at a position higher than the input gear 21. As illustrated in FIG. 7, the catch tank 31 is disposed at a position overlapping the input gear 21 from above. The catch tank 31 has a bottom wall 311 and a side wall 312.

The bottom wall 311 is disposed across the first case 3A and the second case 3B. The bottom wall 311 has a first communication hole 311A and a second communication hole 311B. The first communication hole 311A allows the inside of the catch tank 31 with the first input gear bearing accommodation portion 41A to communicate with each other. The first communication hole 311A sends the oil in the catch tank 31 to the first input gear bearing 27A by gravity.

The second communication hole 311B is provided left of the first communication hole 311A, and communicates the inside of the catch tank 31 with the second input gear bearing accommodation portion 41B. The second communication hole 311B sends the oil in the catch tank 31 to the second input gear bearing 27B by gravity.

The side wall 312 surrounds the bottom wall 311 from four sides. The side wall 312 has an outflow portion 312A and a third communication hole 312B. The outflow portion 312A is a portion having a lower height than other portions in the side wall 312. The outflow portion 312A is a portion having the lowest height in the side wall 312, and is provided in a right region of a rear wall of the side wall 312.

The outflow portion 312A is constituted by part of the rib of the first case 3A, and is provided at a position overlapping the main guide 32 from below. When the position of the liquid level of the oil stored in the catch tank 31 exceeds the height of the outflow portion 312A, the oil flows to the outside of the catch tank 31 (specifically, the right first counter gear flow path 45A) from the outflow portion 312A. An outflow direction of the oil in the outflow portion 312A is backward.

The third communication hole 312B is provided in a left region of the rear wall of the side wall 312. The third communication hole 312B sends the oil in the catch tank 31 to the left first counter gear flow path 45B (see FIG. 6).

<Main Guide>

The main guide 32 sends the oil scraped up by the ring gear 23 to the catch tank 31 when the ring gear 23 rotates in the forward direction of the vehicle (hereinafter, the direction is also referred to as a "first direction"). The main guide 32 is constituted by a rib protruding from the inner face of the first case 3A in the axial direction of the input gear 21.

Figure 8:
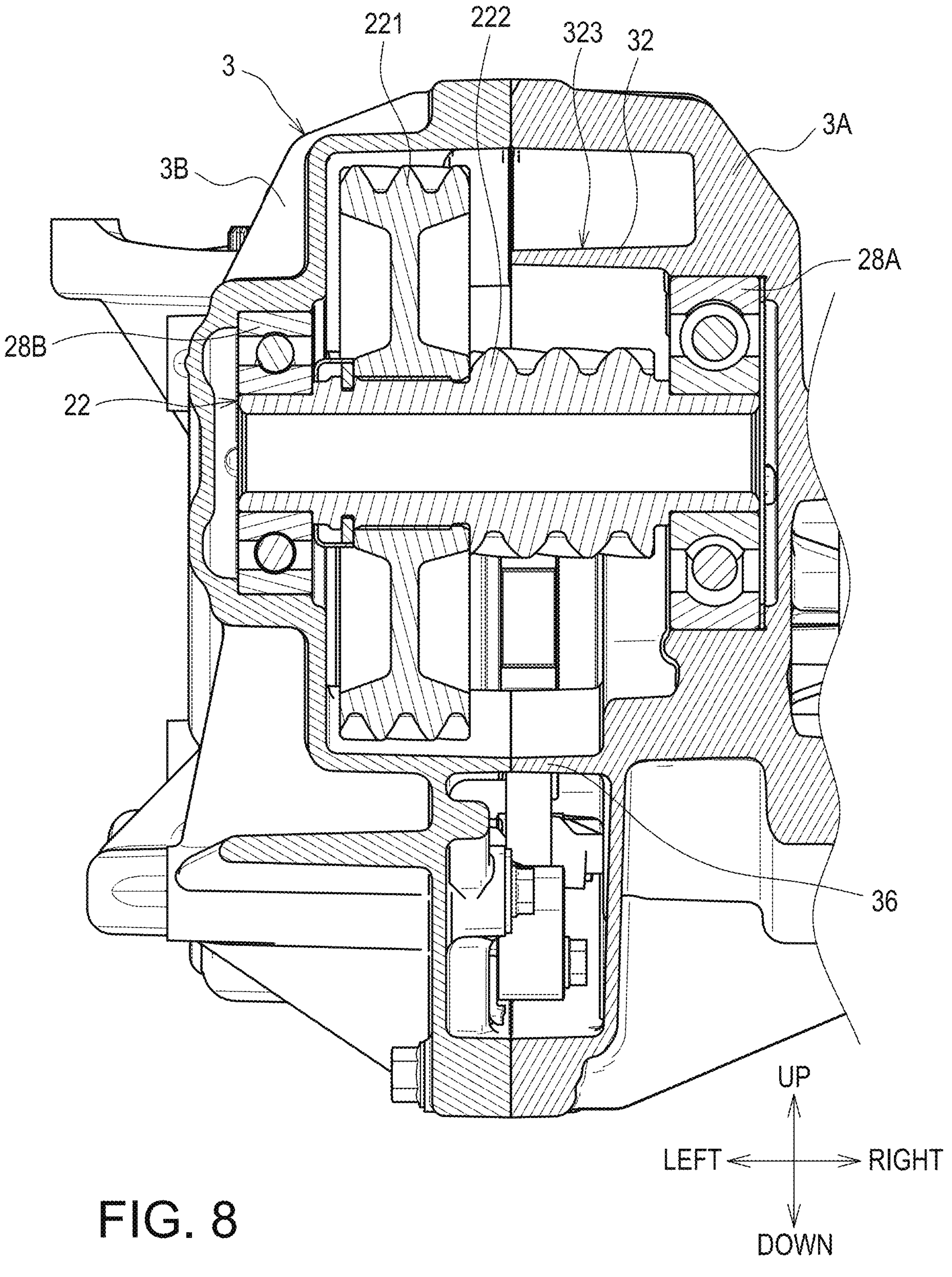
FIG. 8 is a schematic cross-sectional view taken along line VIII-VIII in FIG. 1.

As illustrated in FIG. 8, at least part of the main guide 32 overlaps the first gear 221 when viewed in the axial direction of the counter gear 22. Specifically, the center portion of the main guide 32 in the oil flow direction is disposed on right of the first gear 221.

At least part of the main guide 32 overlaps the second gear 222 when viewed in the radial direction of the counter gear 22. Specifically, the central portion of the main guide 32 in the oil flow direction overlaps the second gear 222 from above.

Further, the main guide 32 is disposed at a position higher than the first counter gear bearing 28A when viewed in the axial direction of the counter gear 22. That is, the main guide 32 extends across the first counter gear bearing 28A in the front-rear direction.

As illustrated in FIG. 5, the main guide 32 has an upstream end 321, a downstream end 322, and a guide face 323. The upstream end 321 and the downstream end 322 are ends in the oil flow direction, respectively. The upstream end 321 is disposed at a position behind and higher than the downstream end 322. Therefore, the main guide 32 constitutes a flow path through which the oil flows from the rear upper side to the front lower side.

As shown in FIG. 1, the upstream end 321 is located radially outside of the ring gear 23. The upstream end 321 is disposed at a position higher than the ring gear 23 and lower than a higher point among an uppermost point P1 of the ring gear 23 and an uppermost point P2 of the first gear 221. Further, the upstream end 321 is disposed at a position parallel to the axial direction of the ring gear 23 and lower than a virtual plane S including the uppermost point P1 of the ring gear 23 and the uppermost point P2 of the first gear 221.

The downstream end 322 is disposed above the catch tank 31. The downstream end 322 is disposed in front of the outflow portion 312A of the catch tank 31.

The guide face 323 is a face on which oil flows toward the catch tank 31. The guide face 323 constitutes an upper face of the main guide 32. As illustrated in FIG. 8, the guide face 323 is inclined with respect to the axial direction of the counter gear 22 so as to be lowered in position toward the left. This inclination is caused by the draft angle of the first case 3A from the mold.

Figure 9:
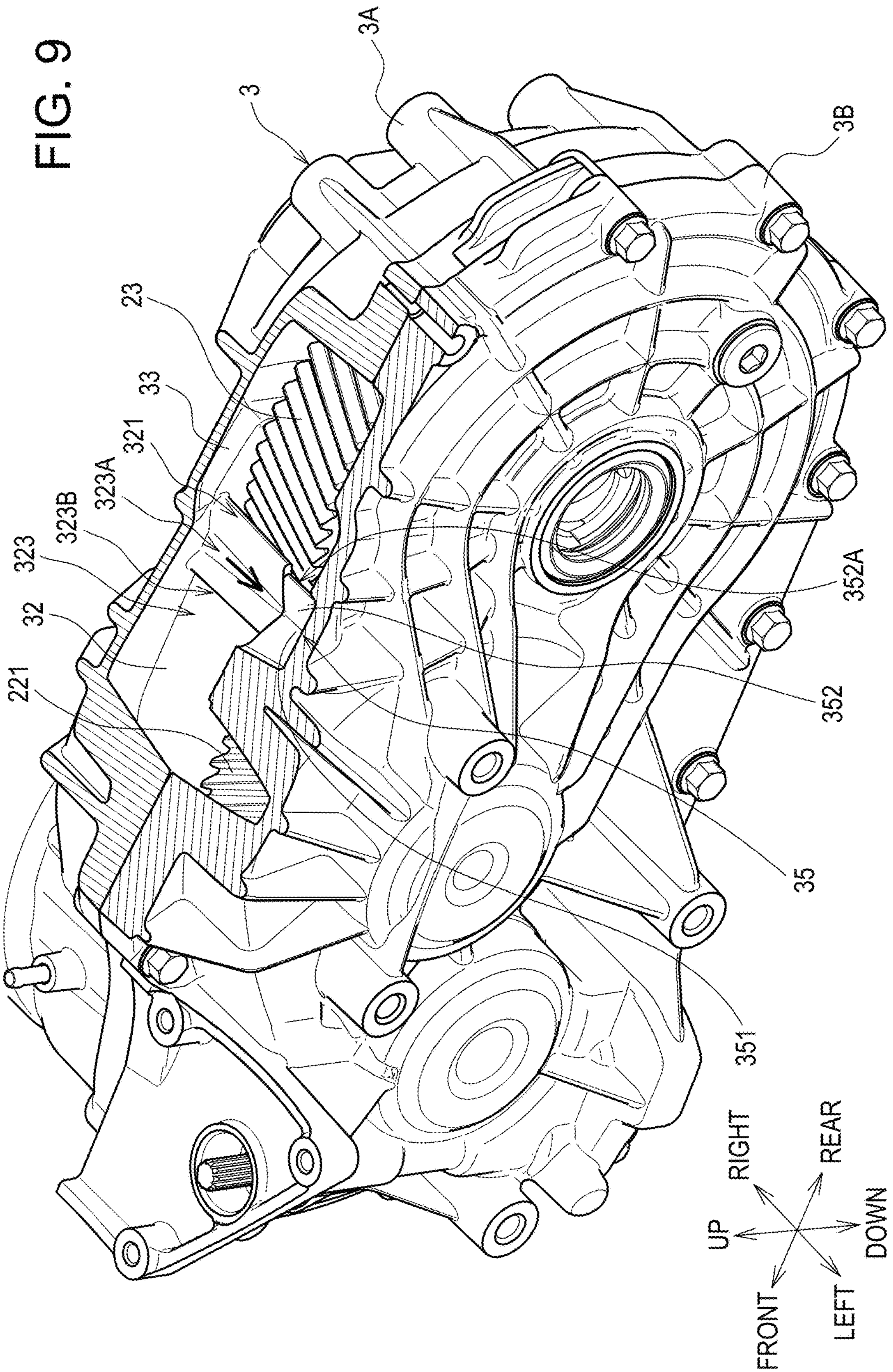
FIG. 9 is a schematic cross-sectional view taken along line IX-IX in FIG. 1.

As illustrated in FIG. 9, the guide face 323 has a groove 323A and a step 323B. The groove 323A is recessed downward and extends along the axial direction of the ring gear 23. Specifically, the groove 323A extends from the inner face of the first case 3A to the buffer portion 35. The groove 323A is disposed between the upstream end 321 of the main guide 32 and the step 323B.

The step 323B is provided downstream of the groove 323A. The oil overflowing from the groove 323A falls along the step 323B and flows toward the downstream end 322. Part of the oil that has reached the upstream end 321 flows leftward (that is, toward the buffer portion 35) as indicated by an arrow in FIG. 9, and the rest goes over the groove 323A and flows toward the downstream end 322.

<Guide Portion>

The guide portion 33 is disposed to be shifted from the main guide 32 in the axial direction (that is, the left-right direction) of the ring gear 23 and guides oil to the main guide 32.

The guide portion 33 is a recess provided in the inner face of the first case 3A. The guide portion 33 is provided right of the main guide 32 and is recessed toward the right. The guide portion 33 extends in the front-rear direction and guides the oil forward. The guide portion 33 forms an oil flow path continuous with the groove 323A of the main guide 32.

As illustrated in FIG. 5, the guide portion 33 extends from a first end 331 to a second end 332. The first end 331 is a front end of the guide portion 33. The first end 331 is coupled to the upstream end 321 of the main guide 32 from above.

The second end 332 is a rear end of the guide portion 33. The second end 332 is disposed at a position overlapping the ring gear 23 when viewed in the axial direction of the ring gear 23. Specifically, when viewed in the axial direction of the ring gear 23, the second end 332 overlaps a portion A1 (see FIG. 1) before reaching the uppermost point P1 of the ring gear 23 or the uppermost point P1 of the ring gear 23 when the ring gear 23 rotates in the first direction. The portion A1 is a region, of the outer peripheral face of the ring gear 23, where the rotation angle θ from the uppermost point P1 is 10° or less.

<Hanging Wall>

As illustrated in FIG. 3, the hanging wall 34 extends downward from the second end 332 of the guide portion 33 toward the window 245 of the differential case 24. The hanging wall 34 is constituted by a rib protruding from the inner face of the first case 3A.

As illustrated in FIG. 5, the hanging wall 34 has a first face 341 and a second face 342 extending in the vertical direction. The first face 341 faces rearward, and the second face 342 faces forward. The oil that has reached a position lower than the second end 332 of the guide portion 33 is guided to the window 245 by the first face 341.

<Buffer Portion>

The buffer portion 35 illustrated in FIG. 9 sends part of the oil flowing through the main guide 32 to the second differential case bearing 29B. The buffer portion 35 is constituted by a rib protruding from the inner face of the second case 3B in the axial direction of the input gear 21.

The buffer portion 35 has a bottom wall 351 and a side wall 352. The bottom wall 351 is coupled to the groove 323A of the main guide 32 in the axial direction of the ring gear 23. That is, the buffer portion 35 is supplied with the oil from the groove 323A.

The side wall 352 surrounds the bottom wall 351 from the front, the rear, and the left. The side wall 352 has an outflow portion 352A. The outflow portion 352A is a portion having a lower height than other portions in the side wall 352. The outflow portion 352A is a portion having the lowest height in the side wall 352, and is provided on a rear wall of the side wall 352.

The outflow portion 352A is provided left of the upstream end 321 of the main guide 32, and causes the oil in the buffer portion 35 to flow toward the second differential case bearing 29B. The height of the uppermost point of the outflow portion 352A is equal to or less than the height of the uppermost point of the groove 323A of the main guide 32.

When the position of the liquid level of the oil stored in the buffer portion 35 exceeds the height of the outflow portion 352A, the oil flows to the outside of the buffer portion 35 from the outflow portion 352A. An outflow direction of the oil in the outflow portion 352A is backward. That is, the flowing direction of the oil from the buffer portion 35 is opposite to the flow direction of the oil in the main guide 32.

<Lower Guide>

The lower guide 36 illustrated in FIG. 4 faces the ring gear 23 from the radially outer side at a position lower than the rotation axis L3 of the ring gear 23, and faces the first gear 221 from the radially outer side at a position lower than the rotation axis L2 of the first gear 221.

The lower guide 36 includes a rib (see FIG. 1) protruding from the inner face of the first case 3A toward the second case 3B (that is, leftward) and a rib protruding from the inner face of the second case 3B toward the first case 3A (that is, rightward).

Specifically, the lower guide 36 has a rear portion 361 extending along the outer edge of the ring gear 23 and a front portion 362 extending forward from the front end of a rear portion 361. The rear portion 361 faces the front lower portion of the ring gear 23. The front portion 362 faces the lower portion of the first gear 221. The front portion 362 reaches the first input gear bearing accommodation portion 41A and the second input gear bearing accommodation portion 41B.

The oil scraped up when the ring gear 23 rotates in the backward direction (hereinafter, the direction is also referred to as a "second direction") of the vehicle is sent to the front portion 362. The oil sent to the front portion 362 is further scraped up by the first gear 221.

As illustrated in FIGS. 5 and 6, the lower guide 36 partitions the internal space of the gear case 3 (that is, the oil storage space) into a front portion 3G and a rear portion 3H. The lower end (that is, the rear end) of the lower guide 36 is away from the lower face of the internal space of the gear case 3. The gap between the lower end of the lower guide 36 and the lower face of the internal space of the gear case 3 forms a flow passage of oil from the front portion 3G to the rear portion 3H.

Since the oil storage space is partitioned by the lower guide 36 in this manner, the amount of oil in which the ring gear 23 is immersed during traveling of the vehicle is reduced, so that the stirring resistance of the ring gear 23 is reduced.

<Reverse Guide>

When the ring gear 23 rotates in the second direction, the reverse guide 37 illustrated in FIG. 6 sends the oil further scraped up by the first gear 221 in the lower guide 36 after the ring gear 23 has scraped up to the catch tank 31. The reverse guide 37 is constituted by a rib protruding from the inner face of the second case 3B in the axial direction of the input gear 21.

Figure 10:
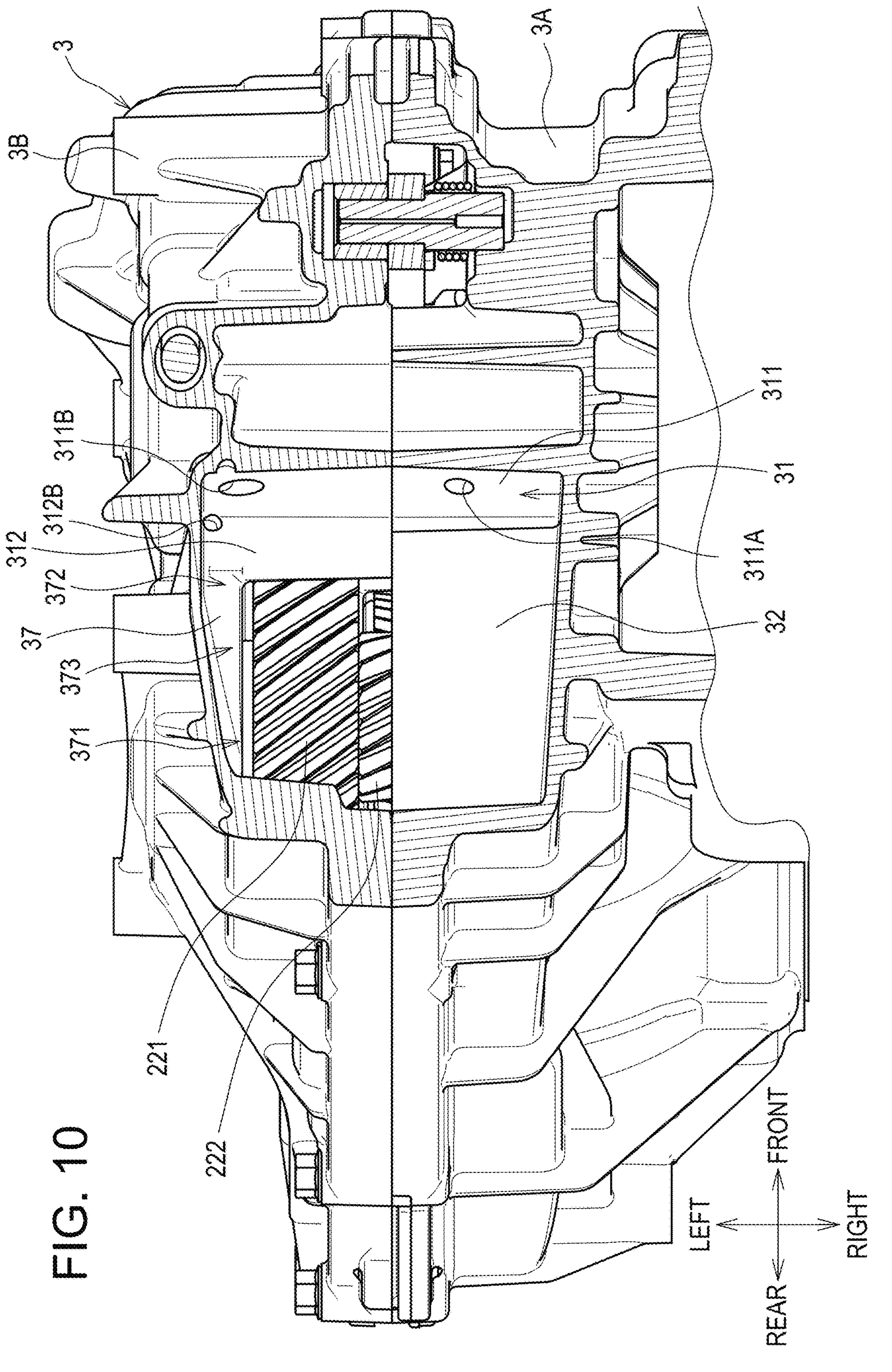
FIG. 10 is a schematic cross-sectional view taken along line X-X in FIG. 4.

As illustrated in FIG. 10, the reverse guide 37 is disposed at a position overlapping the first gear 221 in the axial direction of the counter gear 22. Specifically, the upstream portion of the reverse guide 37 in the oil flow direction is disposed left of the first gear 221.

The reverse guide 37 has an upstream end 371, a downstream end 372, and a guide face 373. The upstream end 371 and the downstream end 372 are ends in the oil flow direction, respectively. As illustrated in FIG. 6, the upstream end 371 is disposed at a position rear of and higher than the downstream end 372. Therefore, the reverse guide 37 constitutes a flow path through which the oil flows from the rear upper side to the front lower side. The upstream end 371 is disposed at a position higher than the second counter gear bearing accommodation portion 42B and in front of the rotation axis L2 of the counter gear 22.

The downstream end 372 is disposed above the catch tank 31. The downstream end 372 is coupled to a rear wall of the side wall 312 of the catch tank 31.

The guide face 373 is a face on which oil flows toward the catch tank 31. The guide face 373 constitutes an upper face of the reverse guide 37. As illustrated in FIG. 10, the guide face 373 has a width (that is, a width in the left-right direction) orthogonal to the oil flow direction increasing toward the catch tank 31.

<Reverse Hanging Wall>

The reverse hanging wall 38 illustrated in FIG. 6 supplies the second differential case bearing 29B with oil scraped up by the ring gear 23 when the ring gear 23 rotates in the second direction.

The reverse hanging wall 38 is constituted by a portion (specifically, a rear wall) of a recess provided in the inner face of the second case 3B. The reverse hanging wall 38 has a wall face facing forward. The reverse hanging wall 38 is disposed behind the buffer portion 35 and above the second differential case bearing accommodation portion 43B.

<Bearing Accommodation Portion>

The first input gear bearing accommodation portion 41A, the first counter gear bearing accommodation portion 42A, and the first differential case bearing accommodation portion 43A illustrated in FIG. 5 accommodate the first input gear bearing 27A, the first counter gear bearing 28A, and the first differential case bearing 29A, respectively.

The first input gear bearing accommodation portion 41A, the first counter gear bearing accommodation portion 42A, and the first differential case bearing accommodation portion 43A are recesses provided in the inner face of the first case 3A. The first input gear bearing accommodation portion 41A has an opening through which the motor shaft is inserted. The first differential case bearing accommodation portion 43A has an opening through which the first output shaft is inserted. An oil seal is disposed in these openings.

The second input gear bearing accommodation portion 41B, the second counter gear bearing accommodation portion 42B, and the second differential case bearing accommodation portion 43B illustrated in FIG. 6 house the second input gear bearing 27B, the second counter gear bearing 28B, and the second differential case bearing 29B, respectively.

The second input gear bearing accommodation portion 41B, the second counter gear bearing accommodation portion 42B, and the second differential case bearing accommodation portion 43B are recesses provided in the inner face of the second case 3B. The second differential case bearing accommodation portion 43B has an opening through which the second output shaft is inserted. An oil seal is disposed in the opening.

<First Counter Gear Flow Path>

The right first counter gear flow path 45A illustrated in FIG. 5 sends the oil flowing out of the outflow portion 312A of the catch tank 31 to the first counter gear bearing 28A. The right first counter gear flow path 45A allows the oil to flow backward toward the first counter gear bearing 28A.

The right first counter gear flow path 45A is formed of a recess and a rib provided in the inner face of the first case 3A. The right first counter gear flow path 45A extends from the outflow portion 312A of the catch tank 31 to the first counter gear bearing accommodation portion 42A.

The left first counter gear flow path 45B illustrated in FIG. 6 sends oil from the catch tank 31 to the second counter gear bearing 28B. The left first counter gear flow path 45B allows the oil to flow backward toward the second counter gear bearing 28B.

The left first counter gear flow path 45B is a communication hole provided in the second case 3B. The left first counter gear flow path 45B is a communication hole that allows the third communication hole 312B of the catch tank 31 and the second counter gear bearing accommodation portion 42B to communicate with each other.

<Second Counter Gear Flow Path>

The second counter gear flow path 46 illustrated in FIG. 5 directly sends the oil scraped up by the ring gear 23 to the first counter gear bearing 28A. The second counter gear flow path 46 causes oil to flow forward toward the first counter gear bearing 28A. The second counter gear flow path 46 is constituted by a rib protruding from the inner face of the first case 3A.

The second counter gear flow path 46 is disposed at a position lower than the upstream end 321 of the main guide 32. Specifically, the entire second counter gear flow path 46 is disposed below the main guide 32. At least part of the second counter gear flow path 46 overlaps the ring gear 23 when viewed in the axial direction of the ring gear 23. The second counter gear flow path 46 extends from a region below and in front of the upstream end 321 of the main guide 32 to the first counter gear bearing accommodation portion 42A.

<Differential Case Flow Path>

The differential case flow path 47 sends oil from the first counter gear bearing 28A to the first differential case bearing 29A. The differential case flow path 47 is a communication hole provided in the first case 3A.

The differential case flow path 47 is disposed below the second counter gear flow path 46. The differential case flow path 47 allows the first counter gear bearing accommodation portion 42A and the first differential case bearing accommodation portion 43A to communicate with each other.

<Parking Lock Mechanism>

The parking lock mechanism 5 illustrated in FIG. 1 can be displaced between a locked state in which the rotation of the input gear 21 is restricted and a released state in which the rotation is permitted.

<Oil Behavior>

As indicated by an arrow in FIG. 5, when the vehicle moves forward (that is, when the ring gear 23 rotates in the first direction D1), the oil O stored in the rear portion 3H of the gear case 3 is scraped up toward the main guide 32 by the ring gear 23.

The oil O scraped up by the ring gear 23 reaches the main guide 32 and is sent to the catch tank 31 by the main guide 32. Further, part of the oil O is sent to the guide portion 33 by the torsion of the ring gear 23. The oil O sent to the guide portion 33 is sent to the main guide 32. The oil O sent to the hanging wall 34 is guided by the hanging wall 34 and supplied to the window 245 of the differential case 24.

The oil O sent to the catch tank 31 is supplied from the first communication hole 311A provided in the bottom wall 311 to the oil seals of the first input gear bearing 27A and the first input gear bearing accommodation portion 41A. The oil O overflowing from the outflow portion 312A of the catch tank 31 is supplied from the right first counter gear flow path 45A to the first counter gear bearing 28A.

Part of the oil scraped up by the ring gear 23 is supplied to the first counter gear bearing 28A by the second counter gear flow path 46 without passing through the catch tank 31. When the rotation speed of the ring gear 23 is low, the amount of the oil O scraped up by the ring gear 23 reaching the main guide 32 decreases, and the amount of the oil O reaching the second counter gear flow path 46 increases.

The oil supplied to the first counter gear bearing 28A is supplied to the first differential case bearing 29A, the oil seal of the first differential case bearing accommodation portion 43A, and the sliding portion between the first shaft portion 243 and the first output shaft by the differential case flow path 47. The oil O supplied to the first differential case bearing 29A is returned to the rear portion 3H of the gear case 3.

As indicated by an arrow in FIG. 6, at the time of forward movement of the vehicle, in the second case 3B, the oil O sent to the catch tank 31 is supplied to the second input gear bearing 27B from the second communication hole 311B provided in the bottom wall 311. The oil O in the catch tank 31 is supplied from the third communication hole 312B to the second counter gear bearing 28B via the left first counter gear flow path 45B.

Part of the oil O scraped up by the ring gear 23 by the main guide 32 is supplied to the buffer portion 35 through the groove 323A of the main guide 32. The oil O overflowing from the outflow portion 352A of the buffer portion 35 is supplied to the second differential case bearing 29B, the oil seal of the second differential case bearing accommodation portion 43B, and the sliding portion between the second shaft portion 244 and the second output shaft. When the vehicle moves forward, the oil does not flow through the reverse guide 37.

Figure 11:
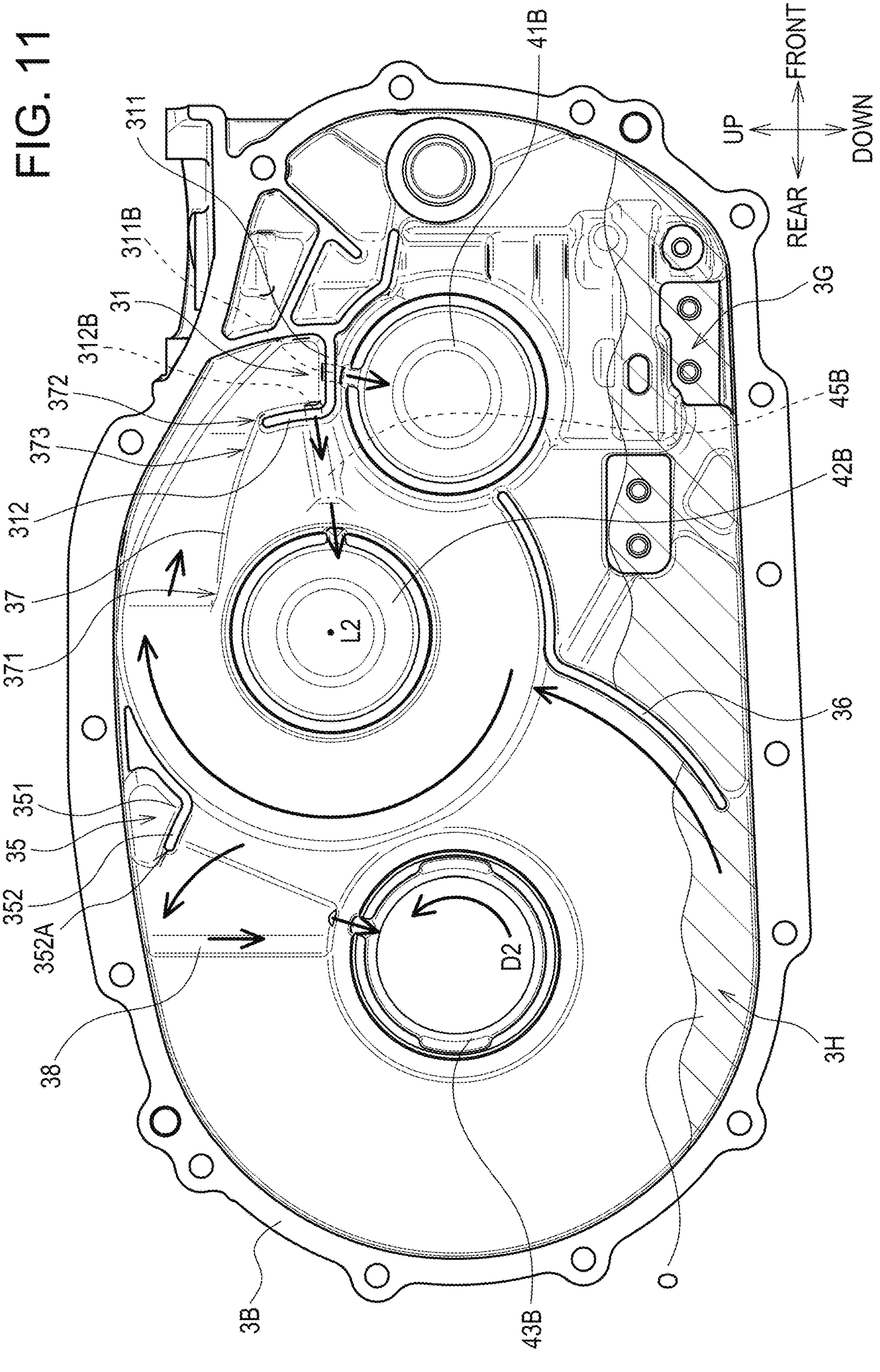
FIG. 11 is a schematic left side view of the second case in FIG. 4.

As indicated by an arrow in FIG. 11, when the vehicle moves backward (that is, when the ring gear 23 rotates in the second direction D2), the oil O accumulated in the rear portion 3H of the gear case 3 is scraped up forward along the lower guide 36 by the ring gear 23. The oil O scraped up on the lower guide 36 by the ring gear 23 is scraped up toward the reverse guide 37 by the first gear 221.

The oil O scraped up by the first gear 221 reaches the reverse guide 37 and is sent to the catch tank 31 by the reverse guide 37. Part of the oil O scraped up by the first gear 221 scatters and reaches the reverse hanging wall 38, and is supplied to the second differential case bearing 29B, the oil seal of the second differential case bearing accommodation portion 43B, and the sliding portion between the second shaft portion 244 and the second output shaft along the wall face of the reverse hanging wall 38.

Figure 12:
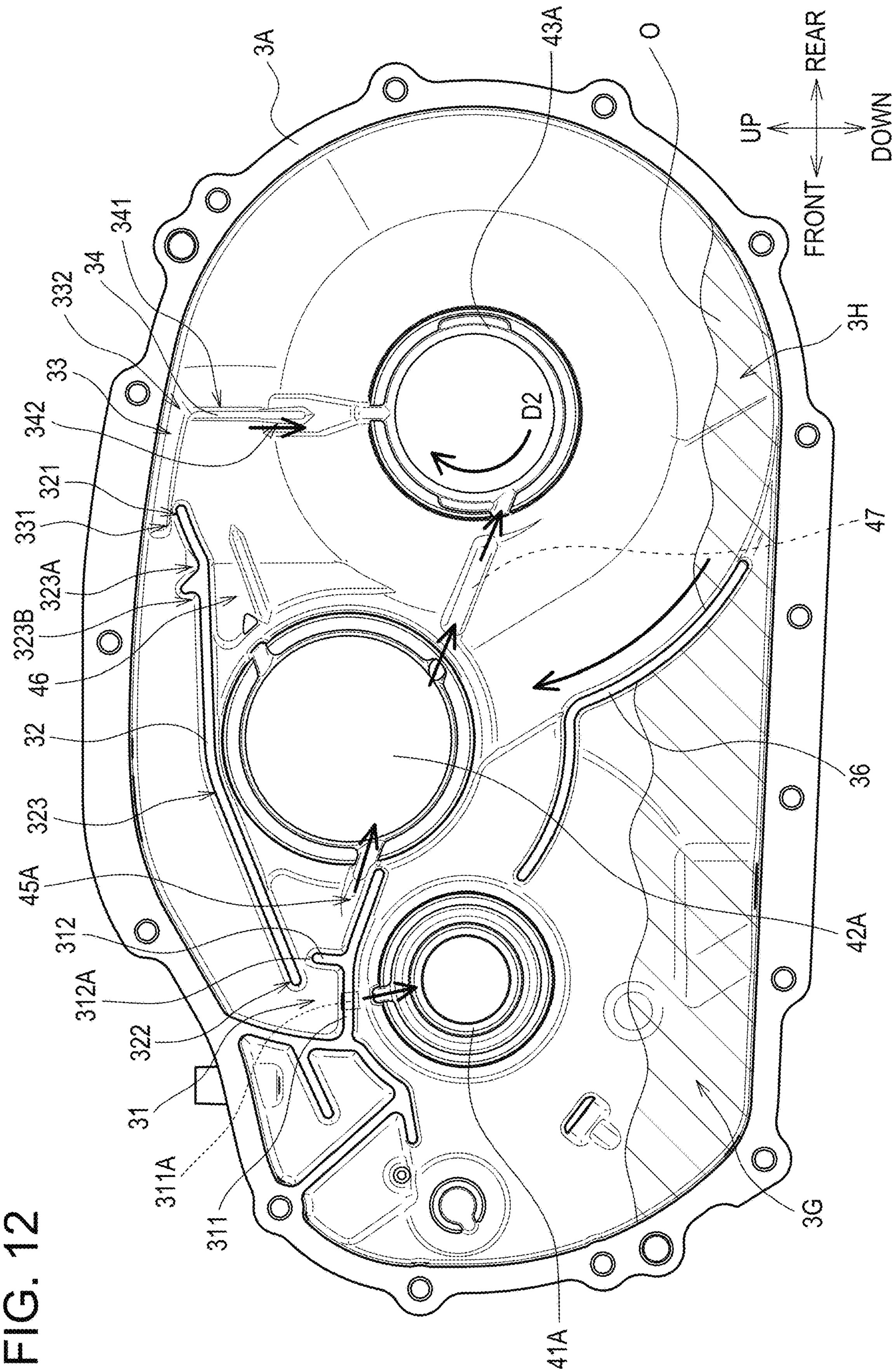
FIG. 12 is a schematic right side view of the first case in FIG. 1.

As indicated by an arrow in FIG. 12, in the first case 3A, part of the oil O scraped up by the ring gear 23 scatters and reaches the second face 342 of the hanging wall 34, and is supplied to the window 245 of the differential case 24.

The oil O sent to the catch tank 31 at the time of backward movement is supplied to each bearing and the oil seal through a flow path similar to that at the time of forward movement. When the vehicle moves backward, the oil does not flow through the main guide 32.

[1-2. Effects]

According to the embodiment described in detail above, the following effects can be obtained.

(1a) Of the oil scraped up by the ring gear 23, the oil pushed out in the axial direction of the ring gear 23 is supplied from the guide portion 33 to the main guide 32. Therefore, it is possible to suppress a decrease in the amount of oil supplied to the catch tank 31.

(1b) Since the oil can be brought close to the guide portion 33 by the torsion of the ring gear 23, the effect of suppressing the decrease in the amount of oil supplied to the catch tank 31 is promoted.

(1c) Since the second end 332 of the guide portion 33 overlaps the portion A1 before reaching the uppermost point P1 of the ring gear 23 or the uppermost point P1, the oil falling off by gravity from the tooth reaching the uppermost point P1 of the ring gear 23 easily reaches the guide portion 33. As a result, the effect of suppressing the decrease in the amount of oil supplied to the catch tank 31 is promoted.

(1d) Since the guide portion 33 is a recess provided in the inner face of the gear case 3, the shape of the guide portion 33 can be simplified, and the cost for forming the guide portion 33 can be reduced.

(1e) Oil that cannot reach the main guide 32 via the guide portion 33 can be efficiently supplied to the inside of the differential case 24 by the hanging wall 34.

2. Other Embodiments

Although the embodiments of the present disclosure have been described above, it is needless to say that the present disclosure is not limited to the above embodiments and can take various forms.

(2a) In the transmission device of the above embodiment, the gear case is not necessarily required to have the first case and the second case. That is, the gear case is not necessarily required to be constituted by parts divided in the axial direction of the input gear. The input gear, the first gear, the second gear, and the ring gear are not necessarily required to be helical gears.

(2b) In the transmission device of the above embodiment, the second end of the guide portion is not necessarily required to overlap a portion before reaching the uppermost point of the ring gear when viewed in the axial direction of the ring gear or the uppermost point. For example, the second end of the guide portion may be disposed below the portion before reach and the uppermost point.

(2c) In the transmission device of the above embodiment, the guide portion is not necessarily required to be constituted by the recess provided in the inner face of the gear case. For example, the guide portion may be constituted by a rib protruding from the inner face of the gear case.

(2d) In the transmission device of the above embodiment, the gear case is not necessarily required to have the hanging wall. That is, the oil may be supplied to the window of the differential case through a flow path other than the hanging wall.

(2e) In the transmission device of the above embodiment, the rotation axis of the counter gear is not necessarily required to be located above the rotation axis of the input gear and the rotation axis of the ring gear.

(2f) The functions of one component in the above embodiment may be distributed as a plurality of components, or the functions of a plurality of components may be integrated into one component. Part of the configuration of the above embodiments may be omitted. At least part of the configuration of the above embodiments may be added to or replaced with the configuration of another above embodiment. Note that all aspects included in the technical idea identified from the wording described in the claims are embodiments of the present disclosure.

The invention claimed is:

1. A transmission device comprising:

a transmission mechanism; and a gear case that accommodates the transmission mechanism, wherein the transmission mechanism includes

- an input gear,
- a counter gear having a rotation axis parallel to a rotation axis of the input gear,
- a ring gear having a rotation axis parallel to the rotation axis of the input gear,
- a differential case fixed to the ring gear,
- a differential mechanism disposed inside the differential case,
- an input gear bearing rotatably supporting the input gear,
- a counter gear bearing rotatably supporting the counter gear, and
- a differential case bearing rotatably supporting the differential case, wherein the counter gear includes

- a first gear that meshes with the input gear, and
- a second gear that has an outer diameter smaller than an outer diameter of the first gear, is disposed concentrically with the first gear, and meshes with the ring gear, wherein the gear case includes

- a catch tank,
- a guide that sends oil scraped up by the ring gear to the catch tank, and
- a guide portion that is disposed at a position axially shifted from the guide in an axial direction of the ring gear and guides the oil to the guide, wherein the guide has an upstream end and a downstream end in a flow direction of the oil,
- the upstream end is located radially outside the ring gear, the guide portion extends from a first end coupled to the upstream end of the guide to a second end overlapping the ring gear when viewed in the axial direction of the ring gear, the guide portion is a recess provided in an inner face of the gear case or a rib protruding from the inner face of the gear case, and when viewed in an axial direction of the ring gear, the second end of the guide portion overlaps either a portion of the ring gear before reaching an uppermost point of the ring gear or the uppermost point of the ring gear when the ring gear rotates in a direction in which the oil is scraped up toward the guide.

2. The transmission device according to claim 1, wherein the ring gear is a helical gear twisted so that the oil is sent toward the guide portion when the ring gear rotates in a direction in which the oil is scraped up toward the guide.

3. The transmission device according to claim 1, wherein the differential case includes a window communicating with an inside of the differential case, and wherein the gear case has a hanging wall extending downward from the second end of the guide portion toward the window.

* * * * *